United States Patent
Zakharov et al.

(10) Patent No.: US 11,887,248 B2
(45) Date of Patent: Jan. 30, 2024

(54) SYSTEMS AND METHODS FOR RECONSTRUCTING A SCENE IN THREE DIMENSIONS FROM A TWO-DIMENSIONAL IMAGE

(71) Applicant: Toyota Research Institute, Inc., Los Altos, CA (US)

(72) Inventors: Sergey Zakharov, San Francisco, CA (US); Wadim Kehl, Shinjuku (JP); Vitor Guizilini, Santa Clara, CA (US); Adrien David Gaidon, Mountain View, CA (US); Rares A. Ambrus, San Francisco, CA (US); Dennis Park, Fremont, CA (US); Joshua Tenenbaum, Cambridge, MA (US); Jiajun Wu, Stanford, CA (US); Fredo Durand, Cambridge, CA (US); Vincent Sitzmann, Cambridge, MA (US)

(73) Assignees: Toyota Research Institute, Inc., Los Altos, CA (US); Massachusetts Institute of Technology, Cambridge, MA (US); The Board of Trustees of the Leland Standford Junior Univeristy, Standford, CA (US)

(*) Notice: Subject to any disclaimer, the term of this patent is extended or adjusted under 35 U.S.C. 154(b) by 126 days.

(21) Appl. No.: 17/696,490

(22) Filed: Mar. 16, 2022

(65) Prior Publication Data
US 2022/0414974 A1 Dec. 29, 2022

Related U.S. Application Data

(60) Provisional application No. 63/214,399, filed on Jun. 24, 2021.

(51) Int. Cl.
G06T 15/20 (2011.01)
G06T 7/70 (2017.01)
G06T 19/20 (2011.01)

(52) U.S. Cl.
CPC .............. G06T 15/205 (2013.01); G06T 7/70 (2017.01); G06T 19/20 (2013.01);
(Continued)

(58) Field of Classification Search
None
See application file for complete search history.

(56) References Cited

U.S. PATENT DOCUMENTS

2019/0043203 A1* 2/2019 Fleishman .............. G06F 18/29
2020/0134849 A1 4/2020 Blasco Claret et al.
2022/0198707 A1* 6/2022 Li ............................ G06T 7/11

OTHER PUBLICATIONS

Parallel domain. https://paralleldomain.com/, May 2021.
(Continued)

*Primary Examiner* — Kee M Tung
*Assistant Examiner* — Jed-Justin Imperial
(74) *Attorney, Agent, or Firm* — Christopher G. Darrow; Darrow Mustafa PC (57) ABSTRACT

Systems and methods described herein relate to reconstructing a scene in three dimensions from a two-dimensional image. One embodiment processes an image using a detection transformer to detect an object in the scene and to generate a NOCS map of the object and a background depth map; uses MLPs to relate the object to a differentiable database of object priors (PriorDB); recovers, from the NOCS map, a partial 3D object shape; estimates an initial object pose; fits a PriorDB object prior to align in geometry and appearance with the partial 3D shape to produce a complete shape and refines the initial pose estimate; generates an editable and re-renderable 3D scene reconstruction based, at least in part, on the complete shape, the refined (Continued)

pose estimate, and the depth map; and controls the operation of a robot based, at least in part, on the editable and re-renderable 3D scene reconstruction.

20 Claims, 5 Drawing Sheets

(52) U.S. Cl.
CPC ............... *G06T 2207/10024* (2013.01); *G06T 2207/20084* (2013.01); *G06T 2219/2016* (2013.01)

(56) References Cited

OTHER PUBLICATIONS

S. Zakharov, W. Kehl, A. Bhargava, and A. Gaidon. Autolabeling 3d objects with differentiable rendering of sdf shape priors. In CVPR, 2020.
H. Pfister, M. Zwicker, J. van Baar, and M. Gross. Surfels: Surface elements as rendering primitives. In SIGGRAPH, 2000.
S. Liu, T. Li, W. Chen, and H. Li. Soft rasterizer: A differentiable renderer for image-based 3d reasoning. In ICCV, 2019.
Y. Cabon, N. Murray, and M. Humenberger. Virtual kitti 2, 2020.
A. Geiger, P. Lenz, and R. Urtasun. Are we ready for autonomous driving? the kitti vision benchmark suite. In CVPR, 2012.
Z. Liu, Z. Wu, and R. To'th. Smoke: Single-stage monocular 3d object detection via keypoint estimation. arXiv preprint arXiv:2002. 10111, 2020.
I. Shugurov, S. Zakharov, and S. Ilic. Dpodv2: Dense correspondence-based 6 dof pose estimation. TPAMI, 2021.
Y. Nie, X. Han, S. Guo, Y. Zheng, J. Chang, and J. J. Zhang. Total3dunderstanding: Joint layout, object pose and mesh reconstruction for indoor scenes from a single image. In CVPR, 2020.
C. Zhang, Z. Cui, Y. Zhang, B. Zeng, M. Pollefeys, and S. Liu. Holistic 3d scene understanding from a single image with implicit representation. In CVPR, 2021.
F. Engelmann, K. Rematas, B. Leibe, and V. Ferrari. From Points to Multi-Object 3D Reconstruction. In CVPR, 2021.
S. Zakharov, W. Kehl, B. Planche, A. Hutter, and S. Ilic. 3d object instance recognition & pose estimation using triplet loss with dynamic margin. In IROS, 2017.
M. Bui, S. Zakharov, S. Albarqouni, S. Ilic, and N. Navab. When regression meets manifold learning for object recognition and pose estimation. In ICRA, 2018.
G. Wang, F. Manhardt, F. Tombari, and X. Ji. Gdr-net: Geometry-guided direct regression network for monocular 6d object pose estimation. In CVPR, 2021.
A. Gaidon, Q. Wang, Y. Cabon, and E. Vig. Virtual worlds as proxy for multi-object tracking analysis. In CVPR, 2016.
A. Paszke, S. Gross, S. Chintala, G. Chanan, E. Yang, Z. DeVito, Z. Lin, A. Desmaison, L. Antiga, and A. Lerer. Automatic differentiation in pytorch. In NIPS-W, 2017.
T.-Y. Lin, M. Maire, S. Belongie, J. Hays, P. Perona, D. Ramanan, P. Dolla'r, and C. L. Zitnick. Microsoft coco: Common objects in context. In European conference on computer vision, pp. 740-755. Springer, 2014.
K. He, X. Zhang, S. Ren, and J. Sun. Deep residual learning for image recognition. In Proceedings of the IEEE conference on computer vision and pattern recognition, pp. 770-778, 2016.
A. Kirillov, K. He, R. Girshick, C. Rother, and P. Dollar. Panoptic segmentation. In Proceedings of the IEEE/CVF Conference on Computer Vision and Pattern Recognition (CVPR), Jun. 2019.
N. Carion et al., "End-to-End Object Detection with Transformers," arXiv:2005.12872v3 [cs.CV], May 28, 2020, available at https://arxiv.org/pdf/2005.12872.pdf.
V. Kniaz et al., "Image-to-Voxel Model Translation for 3D Scene Reconstruction and Segmentation," Proceedings of the European Conference on Computer Vision—ECCV 2020, Springer Nature Switzerland AG, pp. 105-124, abstract linked at https://link.springer.com/chapter/10.1007/978-3-030-58571-6_7.
K. Lin et al., "End-to-End Human Pose and Mesh Reconstruction with Transformers," arXiv:2012.09760v2 [cs.CV], Mar. 28, 2021, found at https://arxiv.org/pdf/2012.09760.pdf.
Z. Han et al., "SeqXY2SeqZ: Structure Learning for 3D Shapes by Sequentially Predicting 1D Occupancy Segments from 2D Coordinates," arXiv:2003.05559v2 [cs.CV], Mar. 16, 2020, found at https://arxiv.org/pdf/2003.05559.pdf.
Z. Landgraf et al., "SIMstack: A Generative Shape and Instance Model for Unordered Object Stacks," arXiv:2103.16442v1 [cs.CV], Mar. 30, 2021, found at https://arxiv.org/pdf/2103.16442.pdf.
Clément Godard, Oisin Mac Aodha, Michael Firman, and Gabriel J. Brostow. Digging into selfsupervised monocular depth prediction. In ICCV, 2019.
Guizilini, V., Hou, R., Li, J., Ambrus, R. and Gaidon, A., Sep. 2019. Semantically-Guided Representation Learning for Self-Supervised Monocular Depth. In International Conference on Learning Representations.
Vitor Guizilini, Rares Ambrus, Sudeep Pillai, Allan Raventos, Adrien Gaidon; "3D Packing for Self-Supervised Monocular Depth Estimation." Proceedings of the IEEE/CVF Conference on Computer Vision and Pattern Recognition (CVPR), 2020, pp. 2485-2494.
Sergey Zakharov, Ivan Shugurov, and Slobodan Ilic. Dpod: 6d pose object detector and refiner. In Proceedings of the IEEE International Conference on Computer Vision, pp. 1941-1950, 2019.
Kiru Park, Timothy Patten, and Markus Vincze. Pix2pose: Pixelwise coordinate regression of 3D objects for 6d pose estimation. In ICCV, 2019.
Zhigang Li, Gu Wang, and Xiangyang Ji. Cdpn: Coordinates-based disentangled pose network for real-time rgb-based 6-dof object pose estimation. In CVPR, 2019.
Jeong Joon Park, Peter Florence, Julian Straub, Richard Newcombe, Steven Lovegrove; "DeepSDF: Learning Continuous Signed distance Functions for Shape Representation." Proceedings of the IEEE/CVF Conference on Computer Vision and Pattern Recognition (CVPR), 2019, pp. 165-174.
Mescheder, Lars, Michael Oechsle, Michael Niemeyer, Sebastian Nowozin, and Andreas Geiger. "Occupancy networks: Learning 3d reconstruction in function space." In Proceedings of the IEEE/CVF Conference on Computer Vision and Pattern Recognition, pp. 4460-4470. 2019.
Chen, Zhiqin, and Hao Zhang. "Learning implicit fields for generative shape modeling." In Proceedings of the IEEE/CVF Conference on Computer Vision and Pattern Recognition, pp. 5939-5948. 2019.
Chabra, Rohan, Jan E. Lenssen, Eddy Ilg, Tanner Schmidt, Julian Straub, Steven Lovegrove, and Richard Newcombe. "Deep local shapes: Learning local sdf priors for detailed 3d reconstruction." In European Conference on Computer Vision, pp. 608-625. Springer, Cham, 2020.
Takikawa, T., Litalien, J., Yin, K., Kreis, K., Loop, C., Nowrouzezahrai, D., . . . & Fidler, S. (2021). Neural geometric level of detail: Real-time rendering with implicit 3D shapes. arXiv preprint arXiv:2101. 10994.
Jeruzalski, Timothy, Boyang Deng, Mohammad Norouzi, J. P. Lewis, Geoffrey Hinton, and Andrea Tagliasacchi. "NASA: Neural Articulated Shape Approximation.".
D. Eigen, C. Puhrsch, and R. Fergus. Depth map prediction from a single image using a multi-scale deep network. arXiv preprint arXiv:1406.2283, 2014.
C. Godard, O. Mac Aodha, M. Firman, and G. J. Brostow. Digging into self-supervised monocular depth prediction. In ICCV, 2019.
V. Guizilini, R. Ambrus, S. Pillai, A. Raventos, and A. Gaidon. 3d packing for self-supervised monocular depth estimation. In IEEE Conference on Computer Vision and Pattern Recognition (CVPR), 2020.
S. Zakharov, I. Shugurov, and S. Ilic. Dpod: Dense 6d pose object detector in rgb images. In ICCV, 2019.
S. Peng, Y. Liu, Q. Huang, X. Zhou, and H. Bao. Pvnet: Pixel-wise voting network for 6dof pose estimation. In CVPR, 2019.

(56) References Cited

OTHER PUBLICATIONS

K. Park, T. Patten, and M. Vincze. Pix2pose: Pixel-wise coordinate regression of objects for 6d pose estimation. In ICCV, 2019.
Y. Chen, S. Huang, T. Yuan, S. Qi, Y. Zhu, and S.-C. Zhu. Holistic++ scene understanding: Single-view 3d holistic scene parsing and human pose estimation with human-object interaction and physical commonsense. In Proceedings of the IEEE/CVF International Conference on Computer Vision, pp. 8648-8657, 2019.
Y. Du, Z. Liu, H. Basevi, A. Leonardis, B. Freeman, J. Tenenbaum, and J. Wu. Learning to exploit stability for 3d scene parsing. In NeurIPS, pp. 1733-1743, 2018.
S. Huang, S. Qi, Y. Xiao, Y. Zhu, Y. N. Wu, and S.-C. Zhu. Cooperative holistic scene understanding: Unifying 3d object, layout, and camera pose estimation. arXiv preprint arXiv:1810.13049, 2018.
Y. Li, G. Wang, X. Ji, Y. Xiang, and D. Fox. Deepim: Deep iterative matching for 6d pose estimation. In ECCV, 2018.
F. Manhardt, W. Kehl, N. Navab, and F. Tombari. Deep model-based 6d pose refinement in rgb. In ECCV, 2018.
I. Shugurov, I. Pavlov, S. Zakharov, and S. Ilic. Multi-view object pose refinement with differentiable renderer. IEEE Robotics and Automation Letters, 6(2):2579-2586, 2021.
A. Kendall, M. Grimes, and R. Cipolla. Posenet: A convolutional network for real-time 6-dof camera relocalization. In ICCV, 2015.
A. Kendall and R. Cipolla. Geometric loss functions for camera pose regression with deep learning. In CVPR, 2017.
F. Walch, C. Hazirbas, L. Leal-Taixe, T. Sattler, S. Hilsenbeck, and D. Cremers. Image-based localization using lstms for structured feature correlation. In ICCV, 2017.
S. Hinterstoisser, S. Holzer, C. Cagniart, S. Ilic, K. Konolige, N. Navab, and V. Lepetit. Multimodal templates for real-time detection of texture-less objects in heavily cluttered scenes. In ICCV, 2011.
S. Hinterstoisser, V. Lepetit, S. Ilic, S. Holzer, G. Bradski, K. Konolige, and N. Navab. Model based training, detection and pose estimation of texture-less 3d objects in heavily cluttere scenes. In ACCV, 2012.
W. Kehl, F. Tombari, N. Navab, S. Ilic, and V. Lepetit. Hashmod: A hashing method for scalable 3d object detection. In BMVC, 2015.
P. Wohlhart and V. Lepetit. Learning descriptors for object recognition and 3d pose estimation. In CVPR, 2015.
O. H. Jafari, S. K. Mustikovela, K. Pertsch, E. Brachmann, and C. Rother. ipose: instance-aware 6d pose estimation of partly occluded objects. In ACCV, 2018.
T. Hodan, D. Barath, and J. Matas. Epos: estimating 6d pose of objects with symmetries. In Proceedings of the IEEE/CVF conference on computer vision and pattern recognition, pp. 11703-11712, 2020.
Z. Li, G. Wang, and X. Ji. Cdpn: Coordinates-based disentangled pose network for real-time rgb-based 6-dof object pose estimation. In CVPR, 2019.
H. Wang, S. Sridhar, J. Huang, J. Valentin, S. Song, and L. J. Guibas. Normalized object coordinate space for category-level 6d object pose and size estimation. In Proceedings of the IEEE/CVF Conference on Computer Vision and Pattern Recognition, pp. 2642-2651, 2019.
J. J. Park, P. Florence, J. Straub, R. Newcombe, and S. Lovegrove Deepsdf: Learning continuous signed distance functions for shape representation. In CVPR, 2019.
L. Mescheder, M. Oechsle, M. Niemeyer, S. Nowozin, and A. Geiger. Occupancy networks: Learning 3d reconstruction in function space. In Proceedings of the IEEE/CVF Conference on Computer Vision and Pattern Recognition, pp. 4460-4470, 2019.
W. Chen, J. Gao, H. Ling, E. J. Smith, J. Lehtinen, A. Jacobson, and S. Fidler. Learning to predict 3d objects with an Interpolation based differentiable renderer. In NeurIPS, 2019.
R. Chabra, J. E. Lenssen, E. Ilg, T. Schmidt, J. Straub, S. Lovegrove, and R. Newcombe. Deep local shapes: Learning local sdf priors for detailed 3d reconstruction. In European Conference on Computer Vision, pp. 608-625. Springer, 2020.

T. Takikawa, J. Litalien, K. Yin, K. Kreis, C. Loop, D. Nowrouzezahrai, A. Jacobson, M. McGuire, and S. Fidler. Neural geometric level of detail: Real-time rendering with implicit 3d shapes. arXiv preprint arXiv:2101.10994, 2021.
B. Deng, J. P. Lewis, T. Jeruzalski, G. Pons-Moll, G. Hinton, M. Norouzi, and A. Tagliasacchi. Nasa: neural articulated shape approximation. arXiv preprint arXiv:1912.03207, 2019.
V. Sitzmann, M. Zollhoefer, and G. Wetzstein. Scene representation networks: Continuous 3d structure-aware neural scene representations. Advances in Neural Information Processing Systems, 32:1121-1132, 2019.
M. Niemeyer, L. Mescheder, M. Oechsle, and A. Geiger. Differentiable volumetric rendering: Learning implicit 3d representations without 3d supervision. In Proceedings of the IEEE/CVF Conference on Computer Vision and Pattern Recognition, pp. 3504-3515, 2020.
B. Mildenhall, P. P. Srinivasan, M. Tancik, J. T. Barron, R. Ramamoorthi, and R. Ng. Nerf: Representing scenes as neural radiance fields for view synthesis. In European Conference on Computer Vision, pp. 405-421. Springer, 2020.
S. Lombardi, T. Simon, J. Saragih, G. Schwartz, A. Lehrmann, and Y. Sheikh. Neural volumes: Learning dynamic renderable volumes from images. arXiv preprint arXiv:1906.07751, 2019.
L. Liu, J. Gu, K. Z. Lin, T.-S. Chua, and C. Theobalt. Neural sparse voxel fields. NeurIPS, 2020.
D. Rebain, W. Jiang, S. Yazdani, K. Li, K. M. Yi, and A. Tagliasacchi. Derf: Decomposed radiance fields. arXiv preprint arXiv:2011.12490, 2020.
D. B. Lindell, J. N. Martel, and G. Wetzstein. Autoint: Automatic integration for fast neural volume rendering. In Proceedings of the conference on Computer Vision and Pattern Recognition (CVPR), 2021.
M. Tancik, B. Mildenhall, T. Wang, D. Schmidt, P. P. Srinivasan, J. T. Barron, and R. Ng. Learned initializations for optimizing coordinate-based neural representations. arXiv preprint arXiv:2012.02189, 2020.
K. Park, U. Sinha, J. T. Barron, S. Bouaziz, D. B. Goldman, S. M. Seitz, and R.-M. Brualla. Deformable neural radiance fields. arXiv preprint arXiv:2011.12948, 2020.
Z. Li, S. Niklaus, N. Snavely, and O. Wang. Neural scene flow fields for space-time view synthesis of dynamic scenes. arXiv preprint arXiv:2011.13084, 2020.
W. Xian, J.-B. Huang, J. Kopf, and C. Kim. Space-time neural irradiance fields for free viewpoint video. arXiv preprint arXiv:2011.12950, 2020.
A. Pumarola, E. Corona, G. Pons-Moll, and F. Moreno-Noguer. DNeRF: Neural Radiance Fields for Dynamic Scenes. In Proceedings of the IEEE/CVF Conference on Computer Vision and Pattern Recognition, 2021.
R. Martin-Brualla, N. Radwan, M. S. M. Sajjadi, J. T. Barron, A. Dosovitskiy, and D. Duckworth. NeRF in the Wild: Neural Radiance Fields for Unconstrained Photo Collections. In CVPR, 2021.
M. Boss, R. Braun, V. Jampani, J. T. Barron, C. Liu, and H. P.Lensch. Nerd: Neural reflectance decomposition from image collections, 2020.
P. P. Srinivasan, B. Deng, X. Zhang, M. Tancik, B. Mildenhall, and J. T. Barron. Nerv: Neural reflectance and visibility fields for relighting and view synthesis. In CVPR, 2021.
M. Niemeyer and A. Geiger. Giraffe: Representing scenes as compositional generative neural feature fields. arXiv preprint arXiv:2011.12100, 2020.
W. Yuan, Z. Lv, T. Schmidt, and S. Lovegrove. Star: Self supervised tracking and reconstruction of rigid objects in motion with neural rendering. arXiv preprint arXiv:2101.01602, 2021.
J. Ost, F. Mannan, N. Thuerey, J. Knodt, and F. Heide. Neural scene graphs for dynamic scenes. arXiv preprint arXiv:2011.10379, 2020.
A. Yu, V. Ye, M. Tancik, and A. Kanazawa. pixelnerf: Neural radiance fields from one or few images. arXiv preprint arXiv:2012.02190, 2020.
N. Carion, F. Massa, G. Synnaeve, N. Usunier, A. Kirillov, and S. Zagoruyko. End-to-end detection with transformers. In ICCV, 2020.

(56) References Cited

OTHER PUBLICATIONS

Z. Zhang. A flexible new technique for camera calibration. IEEE Transactions on pattern analysis and machine Intelligence, 22, 2000.

* cited by examiner

SYSTEMS AND METHODS FOR RECONSTRUCTING A SCENE IN THREE DIMENSIONS FROM A TWO-DIMENSIONAL IMAGE

CROSS-REFERENCE TO RELATED APPLICATION

This application claims the benefit of U.S. Provisional Patent Application No. 63/214,399, "Single-Shot Scene Reconstruction," filed on Jun. 24, 2021, which is incorporated by reference herein in its entirety.

TECHNICAL FIELD

The subject matter described herein relates in general to machine vision and, more specifically, to systems and methods for reconstructing a scene in three dimensions from a two-dimensional image.

BACKGROUND

Decomposing images into disjoint symbolic representations is an important aspect of robotics and computer vision because it permits semantic reasoning over all parts of a scene. Such a decomposition supports a variety of applications (e.g., robotics, augmented reality, and autonomous driving) in which a decomposed scene can be reassembled in different ways, enabling interaction or reenactment. Unfortunately, reconstructing a scene in three dimensions from a single two-dimensional image is inherently ill-posed for a variety of reasons. In particular, ambiguity in projective geometry can be resolved only with prior knowledge of the observed scene.

SUMMARY

An example of a system for reconstructing a scene in three dimensions from a two-dimensional image is presented herein. The system comprises one or more processors and a memory communicably coupled to the one or more processors. The memory stores a scene decomposition module including instructions that when executed by the one or more processors cause the one or more processors to process an image using a detection transformer to detect an object in the scene and to generate a first latent vector for the object, a Normalized Object Coordinate Space (NOCS) map of the object, and a depth map for a background portion of the scene. The memory also stores an object reasoning module including instructions that when executed by the one or more processors cause the one or more processors to process the first latent vector using one or more multilayer perceptrons (MLPs) to produce a second latent vector for the object that represents the object in a differentiable database of object priors. The differentiable database of object priors encodes the geometry of the object priors using signed distance fields (SDFs) and the appearance of the object priors using luminance fields (LFs). The memory also stores a three-dimensional (3D) reasoning module including instructions that when executed by the one or more processors cause the one or more processors to recover, from the NOCS map of the object, a partial 3D shape of the object. The 3D reasoning module also includes instructions that when executed by the one or more processors cause the one or more processors to estimate an initial pose of the object. The 3D reasoning module also includes instructions that when executed by the one or more processors cause the one or more processors to fit an object prior in the differentiable database of object priors to align in geometry and appearance with the partial 3D shape of the object to produce a complete shape of the object and refine the initial pose of the object using a surfel-based differentiable renderer to produce a refined estimated pose of the object. The 3D reasoning module also includes instructions that when executed by the one or more processors cause the one or more processors to generate an editable and re-renderable 3D reconstruction of the scene based, at least in part, on the complete shape of the object, the refined estimated pose of the object, and the depth map for the background portion of the scene. The memory also stores a control module including instructions that when executed by the one or more processors cause the one or more processors to control the operation of a robot based, at least in part, on the editable and re-renderable 3D reconstruction of the scene.

Another embodiment is a non-transitory computer-readable medium for reconstructing a scene in three dimensions from a two-dimensional image and storing instructions that when executed by one or more processors cause the one or more processors to process an image using a detection transformer to detect an object in the scene and to generate a first latent vector for the object, a Normalized Object Coordinate Space (NOCS) map of the object, and a depth map for a background portion of the scene. The instructions also cause the one or more processors to process the first latent vector using one or more multilayer perceptrons (MLPs) to produce a second latent vector for the object that represents the object in a differentiable database of object priors. The differentiable database of object priors encodes the geometry of the object priors using signed distance fields (SDFs) and the appearance of the object priors using luminance fields (LFs). The instructions also cause the one or more processors to recover, from the NOCS map of the object, a partial three-dimensional (3D) shape of the object. The instructions also cause the one or more processors to estimate an initial pose of the object. The instructions also cause the one or more processors to fit an object prior in the differentiable database of object priors to align in geometry and appearance with the partial 3D shape of the object to produce a complete shape of the object and refine the initial pose of the object using a surfel-based differentiable renderer to produce a refined estimated pose of the object. The instructions also cause the one or more processors to generate an editable and re-renderable 3D reconstruction of the scene based, at least in part, on the complete shape of the object, the refined estimated pose of the object, and the depth map for the background portion of the scene. The instructions also cause the one or more processors to control the operation of a robot based, at least in part, on the editable and re-renderable 3D reconstruction of the scene.

Another embodiment is a method of reconstructing a scene in three dimensions from a two-dimensional image, the method comprising processing an image using a detection transformer to detect an object in the scene and to generate a first latent vector for the object, a Normalized Object Coordinate Space (NOCS) map of the object, and a depth map for a background portion of the scene. The method also includes processing the first latent vector using one or more multilayer perceptrons (MLPs) to produce a second latent vector for the object that represents the object in a differentiable database of object priors. The differentiable database of object priors encodes the geometry of the object priors using signed distance fields (SDFs) and the appearance of the object priors using luminance fields (LFs). The method also includes recovering, from the NOCS map of the object, a partial three-dimensional (3D) shape of the object. The method also includes estimating an initial pose of the object. The method also includes fitting an object prior in the differentiable database of object priors to align in geometry and appearance with the partial 3D shape of the object to produce a complete shape of the object and refining the initial pose of the object using a surfel-based differentiable renderer to produce a refined estimated pose of the object. The method also includes generating an editable and re-renderable 3D reconstruction of the scene based, at least in part, on the complete shape of the object, the refined estimated pose of the object, and the depth map for the background portion of the scene. The method also includes controlling operation of a robot based, at least in part, on the editable and re-renderable 3D reconstruction of the scene.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Conventional approaches to three-dimensional (3D) scene reconstruction either do not provide a full decomposition of the scene and regress per-pixel depth, or they estimate poses of already known objects and ignore the rest of the scene geometry. Various embodiments described herein overcome those shortcomings by applying novel scene-reconstruction techniques to produce a fully editable and re-renderable 3D reconstruction of a scene from a single two-dimensional (2D) image. This means the reconstructed scene, in its entirety, can be re-rendered from different novel viewpoints other than that of the camera that produced the original 2D image, and individual objects within the reconstructed scene can be translated, rotated, or even deleted from the scene altogether. The various embodiments described herein thus explain every pixel in the scene, background as well as foreground. This capability supports a variety of robotics applications, including, for example, manually driven vehicles, autonomous vehicles, indoor robots, and aerial drones.

One aspect of the embodiments discussed herein is a scene decomposition network (SDN) that recovers partial canonicalized object shapes in the form of Normalized Object Coordinate Space (NOCS) maps and generates a depth map for the background portion of the scene. The NOCS maps are used to recover partial 3D shapes for the detected objects and to estimate object poses using techniques such as a Perspective-n-Point (PnP) solver algorithm and a random sample consensus (RANSAC) algorithm. Another aspect is that learned differentiable object priors are fit to align with the partial object shapes in terms of geometry and appearance (e.g., color), and the initially predicted poses for the detected objects are refined using a surfel-based differentiable renderer. Another aspect is that, in some embodiments, the neural networks in a scene reconstruction system are trained using exclusively synthetic (computer-generated) data, yet the trained networks perform well with real-world data without domain adaptation. Synthetic data provides at least two advantages: (1) superior ground-truth information and (2) the availability of full shapes of objects, which supports manipulation (translation, rotation, deletion, etc.).

The remainder of this Detailed Description is organized as follows. First, a high-level overview of various embodiments of a scene reconstruction system deployed in a robot is provided in connection with a discussion of FIGS. 1 and 2. Second, a more detailed explanation of the underlying mathematical principles and a discussion of a particular system architecture directed to semi-autonomous and autonomous driving follows in connection with a discussion of FIGS. 3-5. Finally, the methods employed in various embodiments are discussed in connection with the flowchart of FIG. 6.

Figure 1:
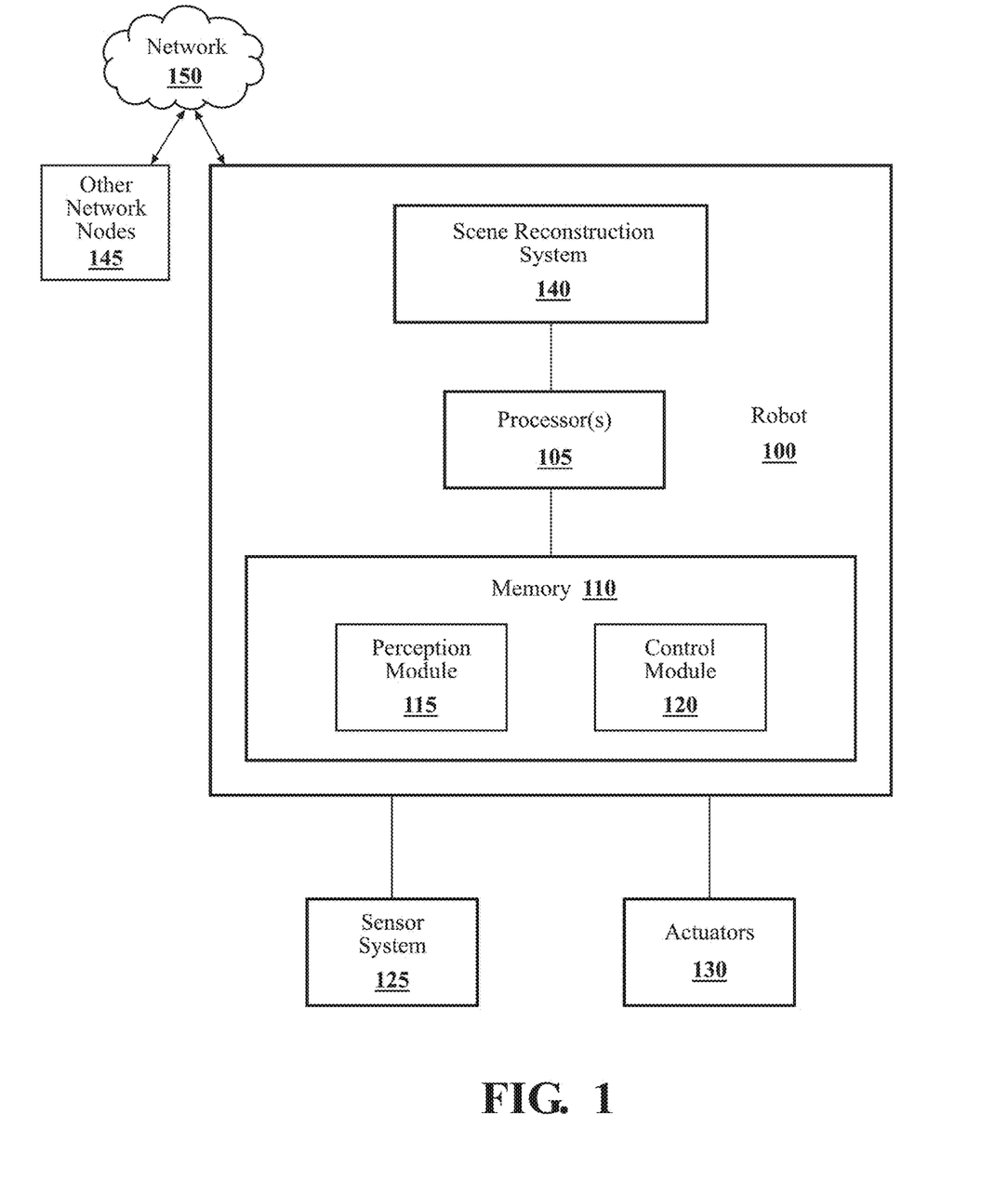
FIG. 1 is a block diagram of a robot, in accordance with an illustrative embodiment of the invention.

Referring to FIG. 1, it is a block diagram of a robot 100, in accordance with an illustrative embodiment of the invention. Robot 100 can be any of a variety of different kinds of robots. For example, in some embodiments, robot 100 is a manually driven vehicle equipped with an Advanced Driver-Assistance System (ADAS) or other system that performs analytical and decision-making tasks to assist a human driver. Such a manually driven vehicle is thus capable of semi-autonomous operation to a limited extent in certain situations (e.g., adaptive cruise control, collision avoidance, lane-change assistance, parking assistance, etc.). In other embodiments, robot 100 is an autonomous vehicle that can operate, for example, at industry defined Autonomy Levels 3-5. In still other embodiments, robot 100 can be a mobile or fixed indoor robot (e.g., a service robot, hospitality robot, companionship robot, manufacturing robot, etc.). In still other embodiments, robot 100 can be an autonomous or semi-autonomous aerial drone. The principles and techniques described herein can be deployed in any robot 100 that performs 3D scene reconstruction from a single 2D image. The foregoing examples of robots are not intended to be limiting.

Robot 100 includes various elements. It will be understood that, in various implementations, it may not be necessary for robot 100 to have all of the elements shown in FIG. 1. The robot 100 can have any combination of the various elements shown in FIG. 1. Further, robot 100 can have additional elements to those shown in FIG. 1. In some arrangements, robot 100 may be implemented without one or more of the elements shown in FIG. 1, including scene reconstruction system 140. While the various elements are shown as being located within robot 100 in FIG. 1, it will be understood that one or more of these elements can be located external to the robot 100. Further, the elements shown may be physically separated by large distances.

In FIG. 1, robot 100 is shown as including one or more processors 105. Robot 100 also includes a memory 110 communicably coupled to the one or more processors 105. The memory 110 stores a perception module 115 and a control module 120. The memory 110 is a random-access memory (RAM), read-only memory (ROM), a hard-disk drive, a flash memory, or other suitable memory for storing the modules 115 and 120. The modules 115 and 120 are, for example, computer-readable instructions that when executed by the one or more processors 105, cause the one or more processors 105 to perform the various functions disclosed herein. More specifically, perception module 115 generally includes instructions that when executed by the one or more processors 105 cause the one or more processors 105 to analyze and perceive the environment surrounding the robot 100 based on, e.g., data from sensor system 125 and other information derived therefrom or received from other sources (e.g., servers, other robots, etc.). Control module 120 generally includes instructions that when executed by the one or more processors 105 cause the one or more processors 105 to control the operation of robot 100. This is based, at least in part, on the information about the environment obtained from perception module 115. In the embodiment shown in FIG. 1, perception module 115 is supported by a scene reconstruction system 140, which is the focus of the remainder of this description.

As shown in FIG. 1, robot 100 can communicate with other network nodes 145 (servers, client computers, mobile devices, other robots, etc.) via network 150. In some embodiments, network 150 includes the Internet. Network 150 can include any of a variety of wired (e.g., Ethernet) and/or wireless (LTE, 5G, WiFi, Bluetooth, etc.) communication technologies. As also shown in FIG. 1, robot 100 includes a sensor system 125 to perceive its environment and one or more actuators 130 to perform physical tasks and otherwise interact with its environment (e.g., to navigate, stop/go, accelerate, decelerate, steer, maneuver, grasp objects, etc.). One important function of the communication capabilities of robot 100 is receiving executable program code and model weights and parameters for trained neural networks that form part of scene reconstruction system 140. In some embodiments, those neural networks can be trained on a different system (e.g., a server) at a different location, and the model weights and parameters of the trained neural networks can be downloaded to robot 100 over network 150. Such an arrangement also supports timely software and/or firmware updates.

Figure 2:
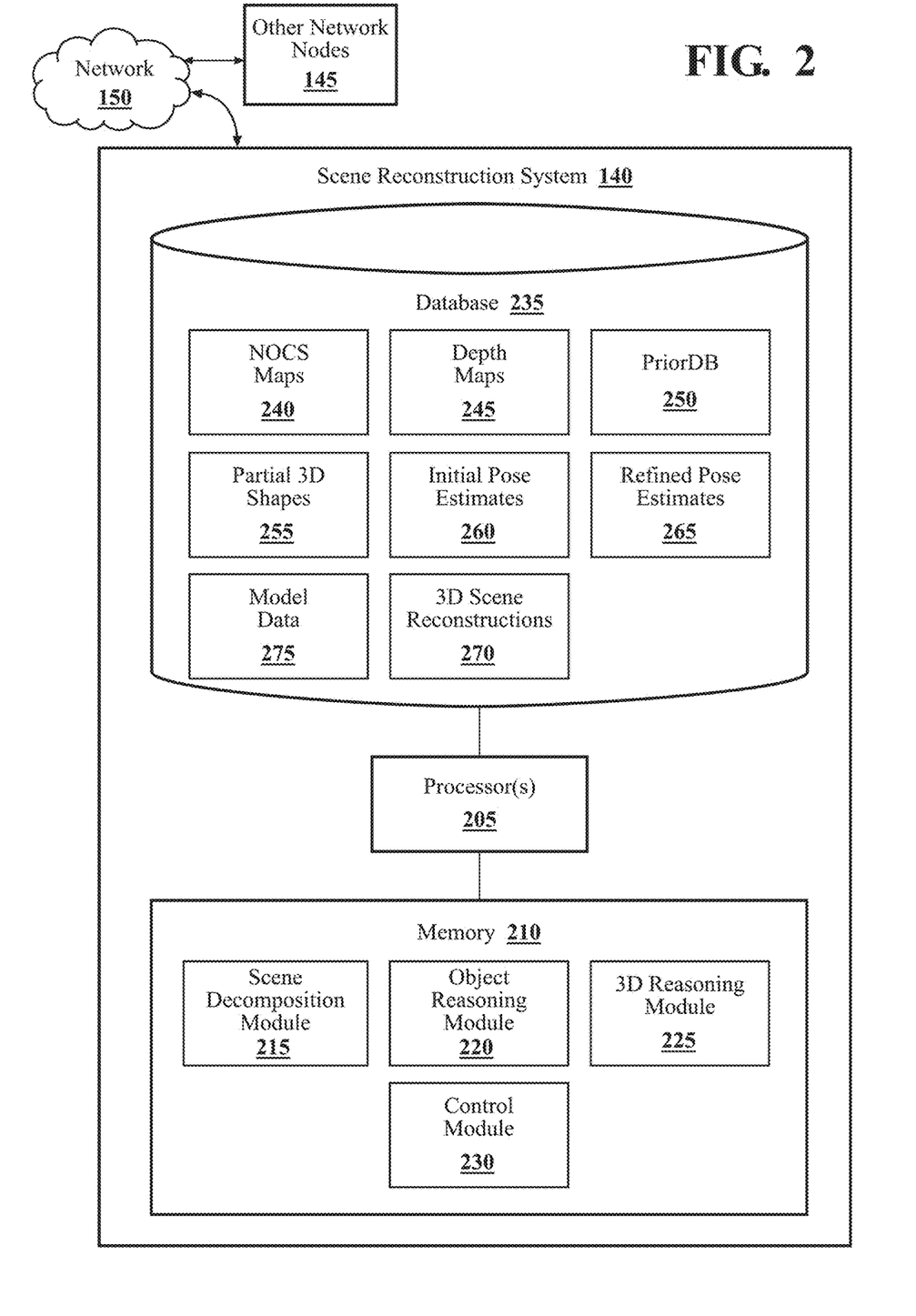
FIG. 2 is a block diagram of a scene reconstruction system, in accordance with an illustrative embodiment of the invention.

FIG. 2 is a block diagram of a scene reconstruction system 140, in accordance with an illustrative embodiment of the invention. As explained above, though FIGS. 1 and 2 depict scene reconstruction system 140 as being deployed in a robot 100, some aspects of scene reconstruction system 140 are, in some embodiments, developed or configured on a different computing system in a different (possibly remote) location and downloaded to robot 100. Examples include the weights and parameters of various neural networks included in scene reconstruction system 140. Some of the techniques used to train those neural networks are discussed in greater detail below.

In FIG. 2, scene reconstruction system 140 is shown as including one or more processors 205. The one or more processors 205 may coincide with the one or more processors 105 of robot 100, scene reconstruction system 140 may include one or more processors that are separate from the one or more processors 105 of robot 100, or scene reconstruction system 140 may access the one or more processors 205 through a data bus or another communication path, depending on the embodiment.

Scene reconstruction system 140 also includes a memory 210 communicably coupled to the one or more processors 205. The memory 210 may be coincident with the memory 110 of robot 100, or it may be a separate memory, depending on the embodiment. The memory 210 stores a scene decomposition module 215, an object reasoning module 220, a 3D reasoning module 225, and a control module 230. The memory 210 is a random-access memory (RAM), read-only memory (ROM), a hard-disk drive, a flash memory, or other suitable memory for storing the modules 215, 220, 225, and 230. The modules 215, 220, 225, and 230 are, for example, computer-readable instructions that when executed by the one or more processors 205, cause the one or more processors 205 to perform the various functions disclosed herein.

In connection with its tasks, scene reconstruction system 140 can store various kinds of data in a database 235. For example, in the embodiment shown in FIG. 2, scene reconstruction system 140 stores, in database 235, NOCS maps 240, depth maps 245, a differentiable database of object priors (PriorDB) 250, partial 3D shapes 255, initial pose estimates 260, refined pose estimates 265, 3D scene reconstructions 270, and model data 275. These various types of data are discussed in greater detail below. Model data 275 includes some of the items associated with the machine-learning models of scene reconstruction system 140, such as latent vectors associated with detected objects produced by neural networks, identifiers for detected objects, 2D bounding-box data for detected objects, hyperparameters, neural-network weights, the results of intermediate calculations, etc.

As shown in FIG. 2, by virtue of the capabilities included in robot 100, scene reconstruction system 140 can communicate with other network nodes 145 (servers, client computers, robots, mobile devices, etc.) via network 150.

Scene decomposition module 215 generally includes instructions that when executed by the one or more processors 205 cause the one or more processors 205 to process an image (e.g., from sensor system 125 of robot 100) using a detection transformer to detect an object in the scene and to generate a first latent vector for the object, a NOCS map 240 of the object, and a depth map 245 for the background portion of the scene. In some embodiments, the 2D input image is a red-green-blue (RGB) image. In other embodiments, the image may be represented in a different color space. For simplicity, this description of scene decomposition module 215 focuses on a single detected object in the scene. However, in practice, scene decomposition module 215 can detect a plurality of objects in a scene, and the processing described below in terms of a single detected object applies to each of the plurality of detected objects. For example, in one embodiment, scene decomposition module 215 is designed to detect up to 100 distinct objects in a single scene. Further details regarding the detection transformer, the first latent vector, and other aspects of scene decomposition module 215 are provided below in connection with FIG. 3.

Object reasoning module 220 generally includes instructions that when executed by the one or more processors 205 cause the one or more processors 205 to process the first latent vector using one or more multilayer perceptrons (MLPs) to produce a second latent vector for the object that represents the object in a differentiable database of object priors (PriorDB 250). As discussed in greater detail below, PriorDB 250 encodes the geometry of the object priors using signed distance fields (SDFs) and the appearance (e.g., color) of the object priors using luminance fields (LFs). In some embodiments, in addition to producing the second latent vector, object reasoning module 220 (more specifically, the MLPs in object reasoning module 220) produces an identifier (class ID) for the detected object, a 2D bounding box for the object, or both.

3D reasoning module 225 generally includes instructions that when executed by the one or more processors 205 cause the one or more processors 205 to recover, from the NOCS map 240 of the object, a partial 3D shape 255 of the object (for an example of this, see FIG. 5). 3D reasoning module 225 also includes instructions that when executed by the one or more processors 205 cause the one or more processors 205 to estimate an initial pose 260 of the detected object. In some embodiments, 3D reasoning module 225, based on the parameters of the camera that produced the 2D input image, estimates the initial pose 260 of the object by performing a PnP solver algorithm and a RANSAC algorithm. This is discussed in greater detail below.

3D reasoning module 225 also includes instructions that when executed by the one or more processors 205 cause the one or more processors 205 to fit an object prior in PriorDB 250 to align in geometry and appearance with the partial 3D shape 255 of the object to produce a complete shape of the object and to refine the initial pose of the object using a surfel-based differentiable renderer to produce a refined estimated pose 265 of the object. These aspects are discussed in greater detail below.

3D reasoning module 225 also includes instructions that when executed by the one or more processors 205 cause the one or more processors 205 to generate an editable and re-renderable 3D reconstruction of the scene (270) based, at least in part, on the complete shape of the object, the refined estimated pose 265 of the object, and the depth map 245 for the background portion of the scene.

In some embodiments, 3D reasoning module 225 also includes instructions that when executed by the one or more processors 205 cause the one or more processors 205 to re-render the editable and re-renderable 3D reconstruction of the scene 270 from a viewpoint different from the original viewpoint of the image. Moreover, in some embodiments, 3D reasoning module 225 also includes instructions that when executed by the one or more processors 205 cause the one or more processors 205 to perform one or more of the following: (1) translating the object within the editable and re-renderable 3D reconstruction of the scene 270, (2) rotating the object within the editable and re-renderable 3D reconstruction of the scene 270, and (3) deleting the object from the editable and re-renderable 3D reconstruction of the scene 270. As discussed above, these manipulations apply to embodiments in which scene decomposition module 215 detects a plurality of objects in the scene. In such an embodiment, 3D reasoning module 225 can manipulate various detected objects individually and differently from one another (e.g., move and/or rotate one object, delete another, etc.).

Control module 230 generally includes instructions that when executed by the one or more processors 205 cause the one or more processors 205 to control operation of a robot 100 based, at least in part, on the editable and re-renderable 3D reconstruction of the scene 270. In some embodiments, control module 230 is coincident with control module 120 discussed above in connection with FIG. 1. In other embodiments, control module 230 is separate from control module 120, but the two control modules operate in coordination with each other. In this context, to "control operation of a robot 100" means to control any aspect of the robot's operation. Examples include the robot's movement trajectory (if the robot is mobile), stopping/going, acceleration, deceleration, actions of various actuators 130, user interfaces, and other interactions of the robot 100 with its environment. A more specific example is an autonomous vehicle. Controlling such a robot includes controlling steering, acceleration, braking, turn signals, and other automated-driving features.

This description next turns to a more detailed explanation of the underlying mathematical concepts employed in scene reconstruction system 140 and a more detailed description of a particular embodiment of a scene reconstruction system 140.

Figure 3:
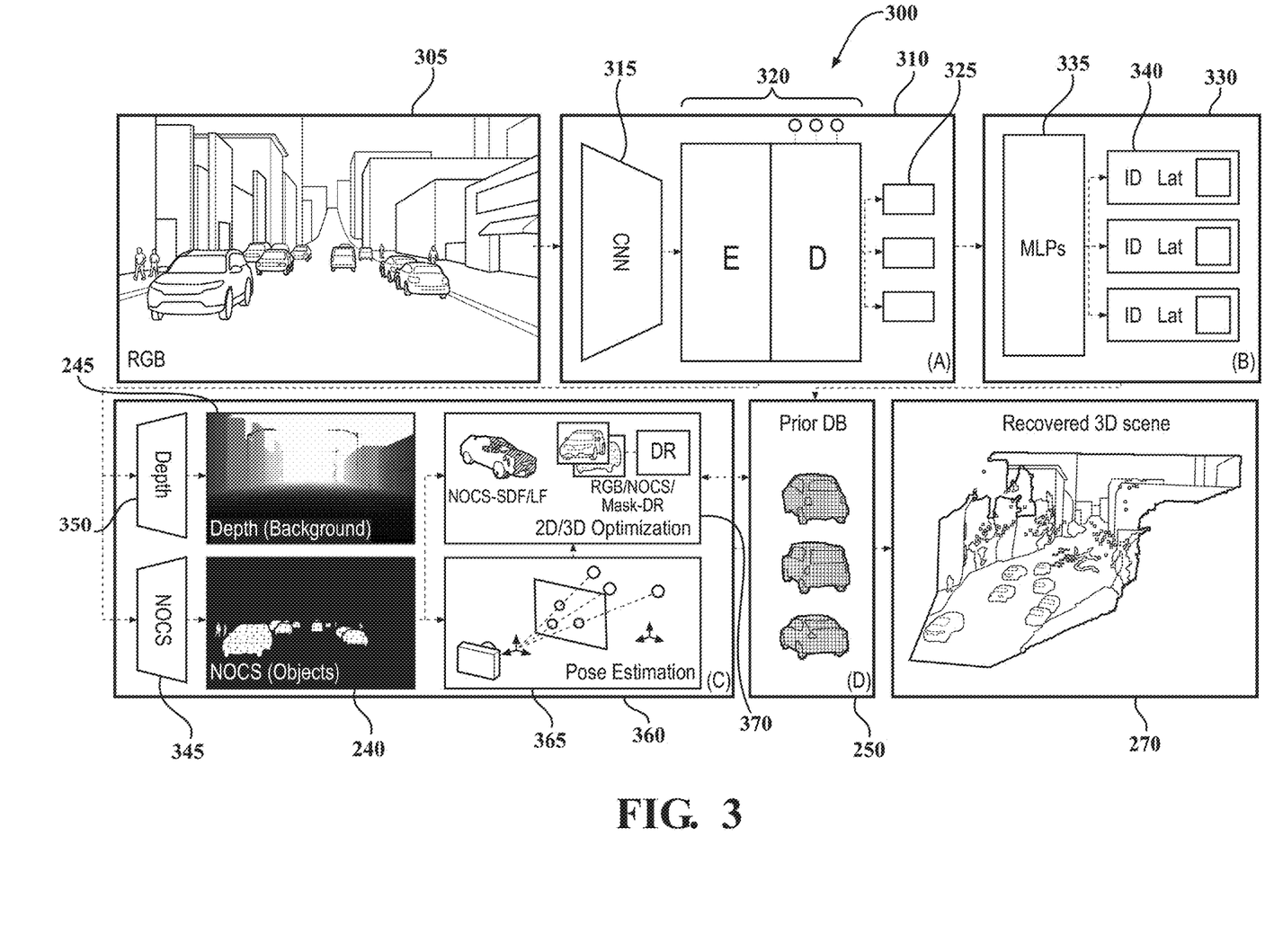
FIG. 3 is an architecture of a scene reconstruction system, in accordance with an illustrative embodiment of the invention.

FIG. 3 is an architecture 300 of a scene reconstruction system 140, in accordance with an illustrative embodiment of the invention. This particular embodiment is directed to autonomous or semi-autonomous driving. Thus, robot 100, in this embodiment, is a semi-autonomous or autonomous vehicle. Note that FIG. 3 has been divided into functional Sections (A), (B), (C), and (D) to facilitate the discussion that follows.

Given a single RGB image 305 of a typical driving scene, the pipelined architecture 300 diagrammed in FIG. 3 holistically reconstructs the scene by not only explaining every visible pixel but also predicting the full geometry and appearance of detected objects and occluded areas that are not visible in the image 305. This is made possible by a combination of three components: a scene decomposition network (SDN), a differentiable database of object priors (PriorDB 250), and a 2D/3D optimization pipeline.

One major component of the architecture 300 shown in FIG. 3 is the SDN. Its primary purpose is to estimate the layout of the scene, detect and identify visible objects, and recover the geometry of both the background and the detected objects. In the architecture 300 shown in FIG. 3, the SDN is divided functionally into a detection transformer block (Section (A)), an object reasoning block (Section (B)), and a 3D reasoning block (Section (C)). In terms of the above discussion in connection with FIG. 2, detection transformer block (Section (A)) corresponds to the functionality of scene decomposition module 215, object reasoning block (Section (B)) corresponds to the functionality of object reasoning module 220, and 3D reasoning block (Section (C)) corresponds to the functionality of 3D reasoning module 225.

Detection Transformer Block (Section (A)). As shown in FIG. 3, detection transformer block 310 includes a convolutional neural network (CNN) 315 (e.g., a ResNet101 backbone) that extracts a set of features from the input image 305 and an encoder-decoder transformer neural network 320 that constructs attention maps between features in the set of extracted features. This self-attention mechanism explicitly models all pairwise interactions between elements in a sequence, making this architecture 300 particularly suitable for specific constraints of set prediction (e.g., duplicate suppression). Using the notion of object queries, it is possible to retrieve output features for each of the detected objects, which are then used as input to the object reasoning block 330 and 3D reasoning block 360. More particularly, encoder-decoder transformer neural network 320 outputs a latent vector 325 (sometimes referred to herein as the "first latent vector") for each detected object. The latent vectors 325 for the detected objects become inputs to object reasoning block 330.

Object Reasoning Block (Section (B)). Object reasoning block 330 takes output features (i.e., latent vectors 325) of the detection transformer block 310 and uses a collection of MLPs 335 to predict important properties for each detected object. In one embodiment, a 3-layer perceptron with ReLU activation and a linear projection layer is used to regress object class IDs (identifiers) and 2D bounding boxes for the respective detected objects. Additionally, object reasoning block 330 regresses signed-distance-field (SDF) and luminance-field (LF) feature vectors (sometimes referred to herein collectively as the "second latent vector" for each detected object), denoted by $z_{sdf}$ and $z_{lf}$ respectively. These feature vectors (the "second latent vector") represent the detected object in PriorDB 250 (the differentiable database of object priors discussed above). In other words, these feature vectors provide an initial state for object reconstruction via PriorDB 250. The 3D shape estimates of the detected objects are then refined by 3D reasoning block 360, as described further below. In FIG. 3, the class IDs, 2D bounding boxes, and latent vectors ("Lat" in FIG. 3) encompassing the SDF and LF feature vectors just mentioned are collectively labeled as MLP outputs 340.

3D Reasoning Block (Section (C)). 3D reasoning block 360 recovers 3D scene information by splitting it into two parts: a background containing road surfaces, buildings, and other objects not detected by the detection transformer and a foreground consisting entirely of detected objects. The output of the transformer decoder 320b for each object is used to compute multi-head attention scores of this embedding over the output of the transformer encoder 320a, generating M attention heatmaps per object. These masks are then used to regress the geometry for both foreground and background.

Figure 5:
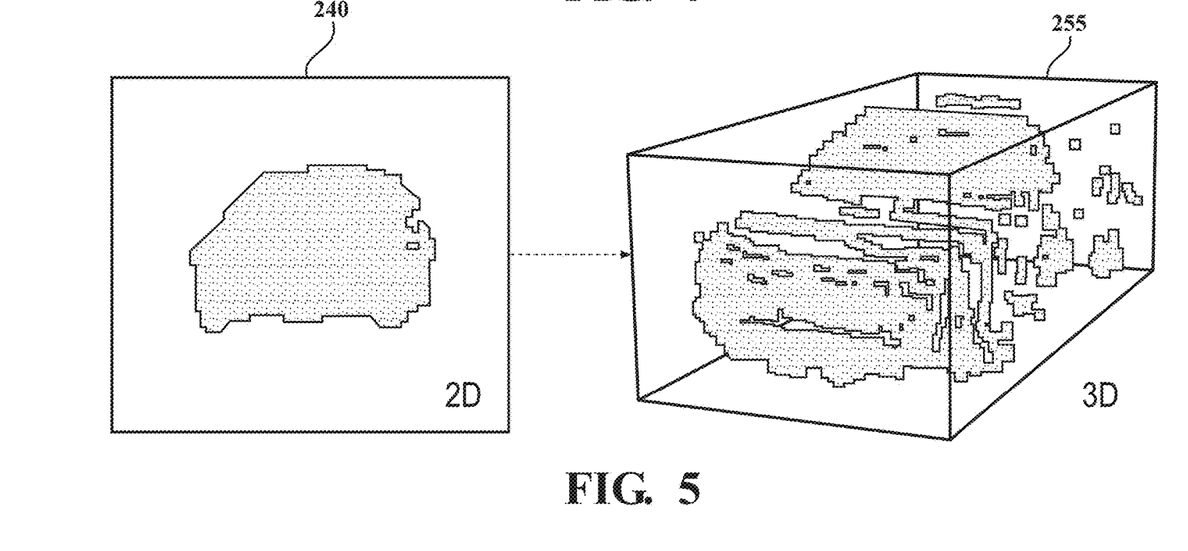
FIG. 5 is a diagram illustrating recovering a partial three-dimensional shape of an object from a two-dimensional Normalized Object Coordinate Space map, in accordance with an illustrative embodiment of the invention.

The foreground is predicted as a set of normalized shape maps (NOCS maps 240 produced by a NOCS network 345). Since they encode 3D coordinates via RGB, visualizing each 3D color component in 3D space enables 3D reasoning block 360 to recover a partial 3D shape 255 of the object in its normalized coordinate space. This is illustrated in FIG. 5, which shows a partial 3D shape 255 that has been recovered from a NOCS map 240 of a detected object. This partial 3D shape 255 enables the processing pipeline to retrieve the object's full geometry and pose.

The background, on the other hand, is represented as a depth map 245 (produced by a depth network 350), since the primary focus is on its geometry. For view synthesis applications, the depth and appearance behind the detected objects can also be predicted by using a generative-adversarial-network-(GAN)-like encoder-decoder generator architecture. This architecture takes masked RGB and depth images and inpaints RGB and depth values for occluded regions, employing a fully convolutional PatchGAN discriminator to judge the genuineness of the inpainted maps.

Given estimated object masks and NOCS maps, 3D reasoning block 360 recovers three things that enable pose estimation (365): (1) 2D coordinates of the object in the image 305, (2) 3D points of the partial 3D object shape 255 in the canonical frame of reference, and (3) their 2D-3D correspondences. This unique representation avoids the need to store a collection of 3D primitives and identify them to find a detected model because both 3D and 2D information is contained in the form of a 3-channel map. The recovered normalized shape is multiplied by the per-class scale factor to recover absolute scale. The six-degrees-of-freedom (6DoF) pose is then estimated using a PnP algorithm that predicts the object pose (260) from given correspondences and camera intrinsics. Since there are a large set of correspondences for each model, PnP is, in some embodiments, combined with RANSAC to increase the robustness of the system against outliers.

Figure 4:
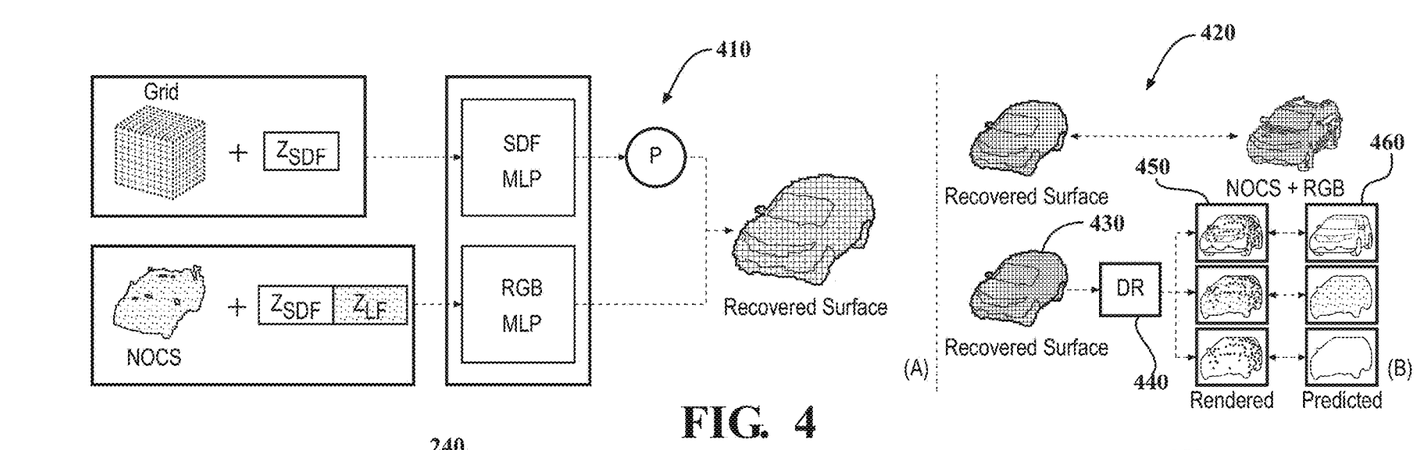
FIG. 4 is a diagram of the generation of a differentiable database of object priors and of shape, appearance, and pose optimization, in accordance with an illustrative embodiment of the invention.

Another major component of the architecture 300 shown in FIG. 3 is a 2D/3D optimization process 370 that is enabled by the PriorDB 250 (see Section (D) in FIG. 3) and a surfel-based differentiable rendering pipeline. These components are further illustrated in FIG. 4, which is divided into Sections (A) and (B). Section (A) of FIG. 4 illustrates a PriorDB learning process 410. The object priors in PriorDB are learned using coordinate-based MLPs, taking positionally encoded features as input and recovering geometry in the form of SDF and appearance on the object's surface. In one embodiment, a 0-isosurface projection (marked "P" in the figure) is used to retrieve an object's surface from an SDF field. In Section (B) pertaining to shape, appearance, and pose optimization, an initial recovered object 430 is refined to fit both predicted observations in terms of masks and a NOCS map 240, as well as ground-truth RGB values from the original input image 305 (see differentiable renderer 440 and rendered and predicted data 450 and 460, respectively, in FIG. 4).

Given output features corresponding to detected objects regressed by object reasoning block 330, the optimization procedure (365, 370) generates full shapes, appearances, and poses for all of the objects in the scene.

The 2D/3D optimization process 370 leverages a differentiable database of object priors, PriorDB 250, as discussed above. PriorDB encodes the shape and luminance of the input models as SDFs and LFs with associated latent feature vectors (again, these latent feature vectors are sometimes referred to herein collectively as the "second latent vector" for a given detected object). Given a partial shape observation, 2D/3D optimization process 370 differentiates against PriorDB to find the maximum likelihood latent vector that best explains the observed shape. The RGB component is optimized similarly, as discussed in greater detail below.

As discussed above, PriorDB 250 represents objects as SDFs (with positive and negative values pointing to exterior and interior areas, respectively), in which each value corresponds to the distance to the closest surface. A single MLP can be used to represent multiple geometries using a single feature vector $z_{sdf}$ and query 3D locations $x=\{x_1, \ldots, x_N\}$ as $f_{sdf}(x; z_{sdf})=s$. Object appearances, on the other hand, are represented as LFs, as discussed above, defining the prior perceived luminance of the object as seen in the training set. Similar to the SDN discussed above, the LF module is implemented as a MLP, but it takes a feature vector by concatenating $z_{sdf}$ and $z_{lf}$ as well as query locations x as input, and outputs resulting luminance as $f_{lf}(x; z_{sdf}, z_{lf})=1$.

In the embodiment shown in FIG. 3, both SDF and LF modules are trained using synthetic data containing high-quality, realistic road scene renderings together with ground-truth annotations. In this embodiment, to train the SDF module, a collection of canonical ground-truth point clouds and associated surface normals representing rendered objects are used. In one embodiment, a total of 27 vehicles are encoded in PriorDB 250. A multi-level octree spanning the volume $[-1,1]^3$ is first defined with points located at the corners of the imaginary voxels of various sizes, depending on the level. For each of the point clouds, unsigned distances are defined by computing nearest neighbors to the octree points. Next, the loss $L_{sdf}$ is defined as the distance to the surface at grid points starting from the coarsest level, gradually increasing the resolution up to the highest level, while considering only points located at pre-defined per-level distances to the surface. In one embodiment, three levels of granularity are used. To ensure that a correct signed field is learned, the distance is minimized between the ground-truth surface normal and an analytically-derived surface normal from the SDF module. Moreover, to ensure that plausible shapes are regressed regardless of the input feature vector, an additional round of refinement is included by sampling random feature vectors and enforcing the output to be equal to the shape of the nearest plausible neighbor.

Once the SDF module has been trained, SDF features $z_{sdf}$ associated with objects are stored, and they are used to train the LF module. In one embodiment, the LF module is trained on partial canonical shapes recovered from provided RGB renderings (refer to Section (A) of FIG. 4) associated with depth maps and poses. The luminance component is computed from RGB renderings, and the LF of each feature is enforced to be the same. The network weights are then optimized to fit the average luminance per object using an L1 loss. Additionally, a symmetry loss $L_{symm}$ is defined enforcing colors on the left side of an object (e.g., a vehicle) to be similar to those on the right side. This can be accomplished by computing nearest neighbors between the left side of the object and an inverted right side and then minimizing the L1 distance between these correspondences.

In the embodiment diagrammed in FIG. 3, the optimizer takes partial canonical object shape and appearance observations (255) (recovered from predicted NOCS maps 240, as shown in Section (B) of FIG. 3), as well as initial PriorDB features. In the embodiment of FIG. 3, due to the robustness of NOCS regression, despite occasional noisy outliers, it is set as the main optimization prior. The initially predicted SDF is used to recover the full surface of the object in the form of a point cloud with surface normal using a 0-isosurface projection. Then, 2D/3D optimization process 370 estimates nearest neighbors between the two point clouds and minimizes the distance between the points by optimizing the feature vector $z_{sdf}$. The RGB component is optimized similarly by minimizing the color difference between the correspondences, but the LF-module weights are permitted to vary for a finer level of detail. In the case of RGB optimization, the $L_{symm}$ loss between the left and right sides of the predicted shape is applied, as discussed above.

Differentiable rendering allows 2D/3D optimization process 370 to optimize objects with respect to both pose and shape. Since a SDF representation is used, differentiable renderers for triangulated meshes are not employed. Instead, 2D/3D optimization process 370 includes a renderer that uses surfels as the primary representation, estimating surface points and normal vector using a 0-isosurface projection followed by a surfel-based rasterizer.

Surface elements or "surfels" are a common concept in computer graphics as an alternative to connected triangular primitives. To render watertight surfaces, the individual surface normals must sufficiently approximate the local region of the object's geometry.

$$d = \frac{n_i \cdot p_i}{n_i \cdot K^{-1}(u, v, 1)^T} \quad (1a)$$

$$P = K^{-1} \cdot (u \cdot d, v \cdot d, d)^T \quad (1b)$$

To construct surface discs, 2D/3D optimization process 370 first estimates the 3D coordinates of the resulting tangent plane given the normal $$n_i = \frac{\partial f(p_i; z)}{\partial p_i}$$

of a projected point $p_i$. The distance d of the plane to each 2D pixel (u, v) is computed by solving a system of linear equations for the plane and camera projections, as defined in Eq. 1a, where $K^{-1}$ is the inverse camera matrix. Then, a 3D plane coordinate is obtained by back-projection (Eq. 1b). Finally, the distance between the plane vertex and surface point is estimated and clamped, if it is larger than a disc diameter, to obtain final discs M=max(diam-$\|p_i-P\|_2$, 0).

2D/3D optimization process 370 combines colors from different surfel primitives based on their depth values to compose a final rendering. The distance of the primitive to the camera defines its final intensity contribution to the image. To ensure that all primitive contributions sum up to unity at each pixel, 2D/3D optimization process 370 uses a modified softmax function. The final rendering function is given in Eq. 2a below, where $\mathcal{J}$ is the output image, S is the estimated NOCS map 240, and $w_i$ represents the weighting masks:

$$\mathcal{J} = \sum_i S(p_i) * w_i \quad (2a)$$

$$w_i = \frac{\exp(-\tilde{D}_i \sigma) M_i}{\sum_j \exp(-\tilde{D}_j \sigma) M_j}. \quad (2b)$$

Eq. 2b defines weighting masks $w_i$, where $\tilde{D}$ is the normalized depth and $\sigma$ is a transparency weight with $\sigma \to \infty$ defining a completely opaque rendering as only the closest primitive is rendered.

Regarding 2D optimization, formally, the embodiment of FIG. 3 defines three losses on the rendering output: $L_{nocs_{2D}}$, $L_{lf_{2D}}$, and $L_{mask_{2D}}$. $L_{nocs_{2D}}$ compares the output of the renderer with predicted NOCS (240). $L_{lf_{2D}}$ compares the output of the renderer with input RGB images 305. $L_{mask_{2D}}$ compares the rendered and predicted masks. The final optimization loss is a weighted sum of both 2D and 3D components. While 3D components ensure a robust shape optimization, 2D losses help to better align the object in 3D space and provide a better luminance matching.

Figure 6:
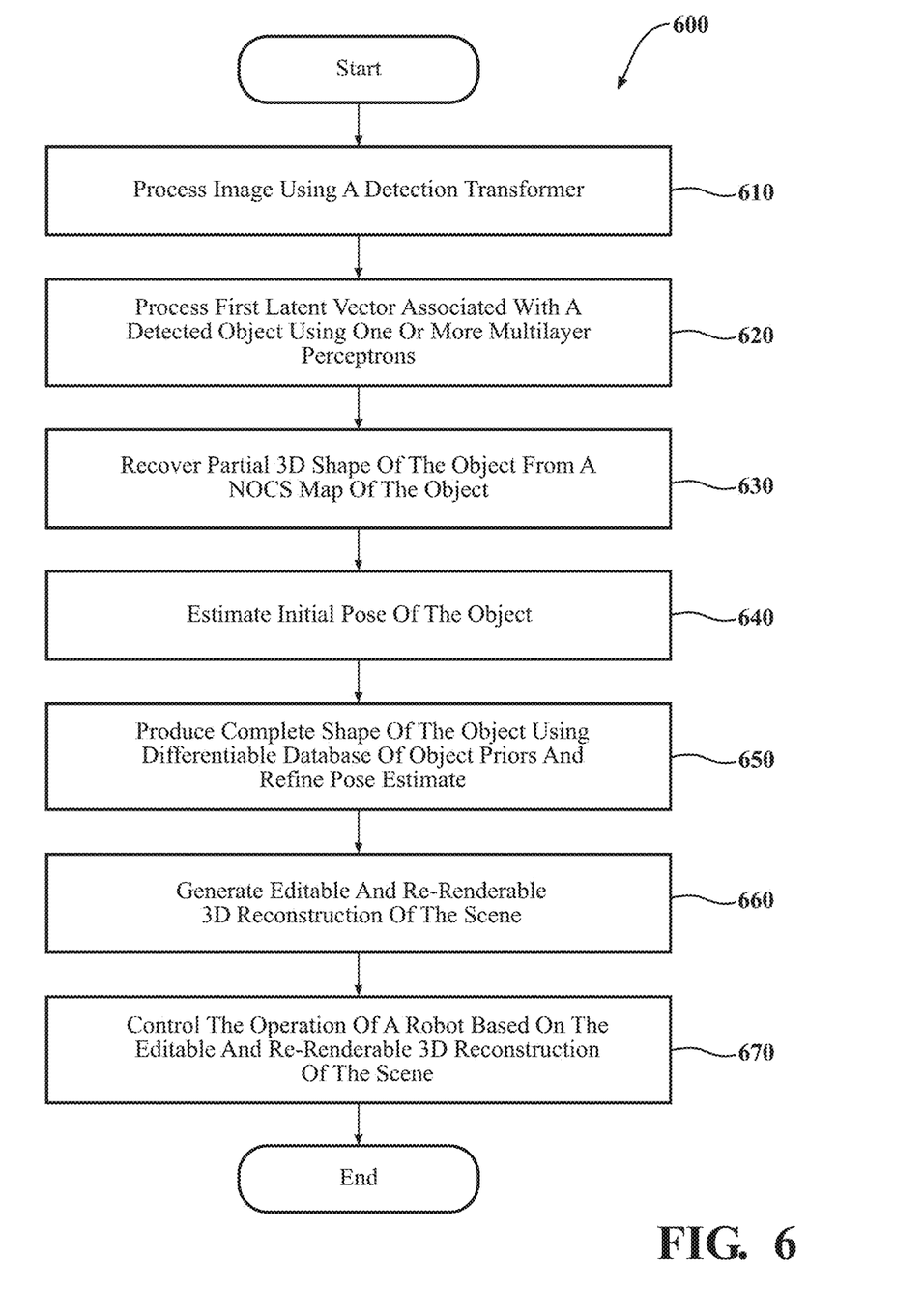
FIG. 6 is a flowchart of a method of reconstructing a scene in three dimensions from a two-dimensional image, in accordance with an illustrative embodiment of the invention.

This description next turns to a discussion of the methods associated with a scene reconstruction system 140, embodiments of which are described above. FIG. 6 is a flowchart of a method 600 of reconstructing a scene in three dimensions from a two-dimensional image, in accordance with an illustrative embodiment of the invention. Method 600 will be discussed from the perspective of scene reconstruction system 140 in FIG. 2 with reference to FIGS. 3-5. While method 600 is discussed in combination with scene reconstruction system 140, it should be appreciated that method 600 is not limited to being implemented within scene reconstruction system 140, but scene reconstruction system 140 is instead one example of a system that may implement method 600.

At block 610, scene decomposition module 215 processes an image 305 using a detection transformer (320) to detect an object in the scene and to generate a first latent vector 325 for the object, a NOCS map 240 of the object, and a depth map 245 for the background portion of the scene. As discussed above, in some embodiments, the 2D input image 305 is an RGB image. As also discussed above, for simplicity, the description herein of scene decomposition module 215 focuses on a single detected object in the scene. However, in practice, scene decomposition module 215 can detect a plurality of objects in a scene, and the processing described above in terms of a single detected object is applied to each of the plurality of detected objects. For example, in one embodiment, scene decomposition module 215 is designed to detect up to 100 distinct objects in a single scene.

At block 620, object reasoning module 220 processes the first latent vector 325 using one or more MLPs 335 to produce a second latent vector (among the MLP outputs 340 shown in FIG. 3) for the object that represents the object in a differentiable database of object priors (PriorDB 250). As discussed above, PriorDB 250 encodes the geometry of the object priors using SDFs and the appearance of the object priors using LFs. As also discussed above, in some embodiments, in addition to producing the second latent vector, object reasoning module 220 (more specifically, the MLPs 335 in object reasoning module 220) produces an identifier (class ID) for the object, a 2D bounding box for the object, or both.

At block 630, 3D reasoning module 225 recovers, from the NOCS map 240 of the object, a partial 3D shape 255 of the object. This is discussed in detail above in connection with FIGS. 3-5.

At block 640, 3D reasoning module 225 estimates an initial pose of the object (refer to Element 365 of FIG. 3). As discussed above, in some embodiments, 3D reasoning module 225, based on the parameters of the camera that produced the 2D input image, estimates the initial pose 260 of the object by performing a PnP solver algorithm and a RANSAC algorithm. This is discussed in greater detail above in connection with FIG. 3.

At block 650, 3D reasoning module 225 fits an object prior in PriorDB 250 to align in geometry and appearance with the partial 3D shape 255 of the object to produce a complete shape of the object and refine the initial pose of the object using a surfel-based differentiable renderer (440) to produce a refined estimated pose 265 of the object. This is discussed in detail above in connection with FIGS. 3 and 4.

At block 660, 3D reasoning module 225 generates an editable and re-renderable 3D reconstruction of the scene 270 based, at least in part, on the complete shape of the object, the refined estimated pose of the object 265, and the depth map 245 for the background portion of the scene. As discussed above, in some embodiments, 3D reasoning module 225 also re-renders the editable and re-renderable 3D reconstruction of the scene 270 from a viewpoint different from the original viewpoint of the image. Moreover, in some embodiments, 3D reasoning module 225 also performs one or more of the following: (1) translating the object within the editable and re-renderable 3D reconstruction of the scene 270, (2) rotating the object within the editable and re-renderable 3D reconstruction of the scene 270, and (3) deleting the object from the editable and re-renderable 3D reconstruction of the scene 270. As also discussed above, such manipulations apply to embodiments in which scene decomposition module 215 detects a plurality of objects in the scene. In such an embodiment, 3D reasoning module 225 can manipulate various detected objects individually and differently from one another (e.g., move and/or rotate one object, delete another, etc.).

At block 670, control module 230 controls the operation of a robot 100 (see FIG. 1) based, at least in part, on the editable and re-renderable 3D reconstruction of the scene 270. As discussed above, in some embodiments, control module 230 is coincident with control module 120 discussed above in connection with FIG. 1 in the context of a robot 100. In other embodiments, control module 230 is separate from control module 120, but the two control modules operate in coordination with each other. In this context, to "control operation of a robot 100" means to control any aspect of the robot's operation. Examples include the robot's movement trajectory (if the robot is mobile), stopping/going, acceleration, deceleration, actions of various actuators 130, user interfaces, and other interactions of the robot 100 with its environment. A more specific example is an autonomous vehicle. Controlling such a robot includes controlling steering, acceleration, braking, turn signals, and other automated-driving features. FIG. 3 shows an embodiment of a scene reconstruction system 140 that is directed to autonomous and semi-autonomous driving.

As discussed above, the various embodiments described herein have wide applicability to different aspects of a variety of different kinds of robots 100. For example, in some embodiments, the robot 100 is a manually driven vehicle equipped with an ADAS or other system that performs analytical and decision-making tasks to assist a human driver. In other embodiments, the robot 100 is an autonomous vehicle capable of operating at, e.g., Autonomy Levels 3-5. In this context, "autonomous vehicle" encompasses specialized outdoor robots such as search-and-rescue robots and delivery robots. In still other embodiments, the robot 100 can be a mobile or fixed indoor robot (e.g., a service robot, hospitality robot, companionship robot, manufacturing robot, etc.). In still other embodiments, the robot 100 can be an autonomous or semi-autonomous aerial drone.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for reconstructing a scene in three dimensions from a two-dimensional image, the system comprising:
   one or more processors; and
   a memory communicably coupled to the one or more processors and storing:
   a scene decomposition module including instructions that when executed by the one or more processors cause the one or more processors to process an image using a detection transformer to detect an object in the scene and to generate a first latent vector for the object, a Normalized Object Coordinate Space (NOCS) map of the object, and a depth map for a background portion of the scene;
   an object reasoning module including instructions that when executed by the one or more processors cause the one or more processors to process the first latent vector using one or more multilayer perceptrons (MLPs) to produce a second latent vector for the object that represents the object in a differentiable database of object priors, wherein the differentiable database of object priors encodes geometry of the object priors using signed distance fields (SDFs) and appearance of the object priors using luminance fields (LFs);
   a three-dimensional (3D) reasoning module including instructions that when executed by the one or more processors cause the one or more processors to:
   recover, from the NOCS map of the object, a partial 3D shape of the object;
   estimate an initial pose of the object;
   fit an object prior in the differentiable database of object priors to align in geometry and appearance with the partial 3D shape of the object to produce a complete shape of the object and refine the initial pose of the object using a surfel-based differentiable renderer to produce a refined estimated pose of the object; and generate an editable and re-renderable 3D reconstruction of the scene based, at least in part, on the complete shape of the object, the refined estimated pose of the object, and the depth map for the background portion of the scene; and a control module including instructions that when executed by the one or more processors cause the one or more processors to control operation of a robot based, at least in part, on the editable and re-renderable 3D reconstruction of the scene.

2. The system of claim 1, wherein the instructions in the object reasoning module to process the first latent vector using the one or more MLPs include instructions that when executed by the one or more processors cause the one or more processors to produce, for the object, at least one of an identifier and a two-dimensional (2D) bounding box.

3. The system of claim 1, wherein the instructions in the 3D reasoning module to estimate the initial pose of the object include instructions that when executed by the one or more processors cause the one or more processors, based on parameters of a camera that produced the image, to perform a Perspective-n-Point (PnP) solver algorithm and a random sample consensus (RANSAC) algorithm.

4. The system of claim 1, wherein the robot is one of a manually driven vehicle, an autonomous vehicle, an indoor robot, and an aerial drone.

5. The system of claim 1, wherein the detection transformer includes a convolutional neural network that extracts a set of features from the image and an encoder-decoder transformer neural network that constructs attention maps between features in the set of features.

6. The system of claim 1, wherein the 3D reasoning module includes further instructions that when executed by the one or more processors cause the one or more processors to re-render the editable and re-renderable 3D reconstruction of the scene from a viewpoint different from an original viewpoint of the image.

7. The system of claim 1, wherein the 3D reasoning module includes further instructions that when executed by the one or more processors cause the one or more processors to perform one or more of translating the object within the editable and re-renderable 3D reconstruction of the scene, rotating the object within the editable and re-renderable 3D reconstruction of the scene, and deleting the object from the editable and re-renderable 3D reconstruction of the scene.

8. The system of claim 1, wherein the image is a red-green-blue (RGB) image.

9. A non-transitory computer-readable medium for reconstructing a scene in three dimensions from a two-dimensional image and storing instructions that when executed by one or more processors cause the one or more processors to:

process an image using a detection transformer to detect an object in the scene and to generate a first latent vector for the object, a Normalized Object Coordinate Space (NOCS) map of the object, and a depth map for a background portion of the scene;

process the first latent vector using one or more multilayer perceptrons (MLPs) to produce a second latent vector for the object that represents the object in a differentiable database of object priors, wherein the differentiable database of object priors encodes geometry of the object priors using signed distance fields (SDFs) and appearance of the object priors using luminance fields (LFs);

recover, from the NOCS map of the object, a partial three-dimensional (3D) shape of the object;

estimate an initial pose of the object;

fit an object prior in the differentiable database of object priors to align in geometry and appearance with the partial 3D shape of the object to produce a complete shape of the object and refine the initial pose of the object using a surfel-based differentiable renderer to produce a refined estimated pose of the object;

generate an editable and re-renderable 3D reconstruction of the scene based, at least in part, on the complete shape of the object, the refined estimated pose of the object, and the depth map for the background portion of the scene; and control operation of a robot based, at least in part, on the editable and re-renderable 3D reconstruction of the scene.

10. The non-transitory computer-readable medium of claim 9, wherein the detection transformer includes a convolutional neural network that extracts a set of features from the image and an encoder-decoder transformer neural network that constructs attention maps between features in the set of features.

11. The non-transitory computer-readable medium of claim 9, wherein the instructions include further instructions to re-render the editable and re-renderable 3D reconstruction of the scene from a viewpoint different from an original viewpoint of the image.

12. The non-transitory computer-readable medium of claim 9, wherein the instructions include further instructions to perform one or more of translating the object within the editable and re-renderable 3D reconstruction of the scene, rotating the object within the editable and re-renderable 3D reconstruction of the scene, and deleting the object from the editable and re-renderable 3D reconstruction of the scene.

13. A method of reconstructing a scene in three dimensions from a two-dimensional image, the method comprising:

processing an image using a detection transformer to detect an object in the scene and to generate a first latent vector for the object, a Normalized Object Coordinate Space (NOCS) map of the object, and a depth map for a background portion of the scene;

processing the first latent vector using one or more multilayer perceptrons (MLPs) to produce a second latent vector for the object that represents the object in a differentiable database of object priors, wherein the differentiable database of object priors encodes geometry of the object priors using signed distance fields (SDFs) and appearance of the object priors using luminance fields (LFs);

recovering, from the NOCS map of the object, a partial three-dimensional (3D) shape of the object;

estimating an initial pose of the object;

fitting an object prior in the differentiable database of object priors to align in geometry and appearance with the partial 3D shape of the object to produce a complete shape of the object and refining the initial pose of the object using a surfel-based differentiable renderer to produce a refined estimated pose of the object;

generating an editable and re-renderable 3D reconstruction of the scene based, at least in part, on the complete shape of the object, the refined estimated pose of the object, and the depth map for the background portion of the scene; and controlling operation of a robot based, at least in part, on the editable and re-renderable 3D reconstruction of the scene.

14. The method of claim 13, wherein the processing the first latent vector using the one or more MLPs additionally produces, for the object, at least one of an identifier and a two-dimensional (2D) bounding box.

15. The method of claim 13, wherein the estimating the initial pose of the object includes, based on parameters of a camera that produced the image, performing a Perspective-n-Point (PnP) solver algorithm and a random sample consensus (RANSAC) algorithm.

16. The method of claim 13, wherein the robot is one of a manually driven vehicle, an autonomous vehicle, an indoor robot, and an aerial drone.

17. The method of claim 13, wherein the detection transformer includes a convolutional neural network that extracts a set of features from the image and an encoder-decoder transformer neural network that constructs attention maps between features in the set of features.

18. The method of claim 13, further comprising re-rendering the editable and re-renderable 3D reconstruction of the scene from a viewpoint different from an original viewpoint of the image.

19. The method of claim 13, further comprising performing one or more of translating the object within the editable and re-renderable 3D reconstruction of the scene, rotating the object within the editable and re-renderable 3D reconstruction of the scene, and deleting the object from the editable and re-renderable 3D reconstruction of the scene.

20. The method of claim 13, wherein the image is a red-green-blue (RGB) image.

* * * * *